United States Patent
Arya (10) Patent No.: US 6,731,466 B2
(45) Date of Patent: May 4, 2004

(54) SUSPENSION WITH INTEGRAL CONSTRAINED AND SANDWICHED LAYER DAMPING

(75) Inventor: Satya Prakash Arya, San Jose, CA (US)

(73) Assignee: International Business Machines, Inc., Armonk, NY (US)

(*) Notice: Subject to any disclaimer, the term of this patent is extended or adjusted under 35 U.S.C. 154(b) by 118 days.

(21) Appl. No.: 10/132,487

(22) Filed: Apr. 25, 2002

(65) Prior Publication Data

US 2003/0202284 A1 Oct. 30, 2003

(51) Int. Cl.[7] .............................. G11B 5/48; G11B 21/16
(52) U.S. Cl. ............................................ 360/244.3
(58) Field of Search ........................ 360/244.2, 244.3, 360/244.8, 244.9, 245, 245.2, 97.02, 97.03

(56) References Cited

U.S. PATENT DOCUMENTS

| | | | |
|---|---|---|---|
| 3,936,881 A | 2/1976 | Orlando et al. .............. 360/103 |
| 4,760,478 A | 7/1988 | Pal et al. ..................... 360/104 |
| 4,991,045 A | 2/1991 | Oberg ......................... 360/104 |
| 5,187,625 A | 2/1993 | Blaeser et al. ............... 360/104 |
| 5,530,606 A | 6/1996 | Baasch et al. ............... 360/104 |
| 5,572,387 A | 11/1996 | Brooks, Jr. et al. .......... 360/104 |
| 5,594,607 A | 1/1997 | Erpelding et al. ........... 360/104 |
| 5,606,477 A | 2/1997 | Erpelding et al. ........... 360/104 |
| 5,771,135 A | 6/1998 | Ruiz et al. ................... 360/104 |
| 5,793,569 A | 8/1998 | Christianson et al. ....... 360/104 |
| 5,864,445 A | 1/1999 | Bennin et al. ............... 360/104 |
| 5,909,342 A | 6/1999 | Forbord et al. .............. 360/106 |
| 6,005,750 A * | 12/1999 | Willard et al. ............. 360/244.8 |
| 6,209,842 B1 | 4/2001 | Anderson et al. ............ 248/560 |
| 6,212,043 B1 | 4/2001 | Nakamura et al. ........ 360/244.3 |
| 6,215,622 B1 | 4/2001 | Ruiz et al. ................ 360/244.3 |
| 6,215,623 B1 | 4/2001 | Zhu ......................... 360/244.3 |
| 6,215,627 B1 | 4/2001 | Resh et al. ............... 360/245.6 |
| 6,271,996 B1 * | 8/2001 | Houk et al. .............. 360/244.9 |
| 6,297,933 B1 * | 10/2001 | Khan et al. .............. 360/244.2 |
| 6,576,148 B1 * | 6/2003 | Shum et al. .................. 216/13 |
| 6,585,902 B1 * | 7/2003 | Shum et al. .................. 216/13 |
| 6,594,114 B1 * | 7/2003 | Suzuki et al. ............ 360/244.3 |
| 6,636,382 B2 * | 10/2003 | Shiraishi .................. 360/244.3 |
| 2002/0181155 A1 * | 12/2002 | Takagi ..................... 360/244.3 |

* cited by examiner

*Primary Examiner*—Jefferson Evans
(74) *Attorney, Agent, or Firm*—Walter W. Duft

(57) ABSTRACT

A suspension member is designed to carry a slider and read/write head elements in a magnetic data storage device. The suspension member is formed from a composite laminate structure that includes first and second primary layers sandwiching an intermediate damping layer that lies between the primary layers. One or more integral constrained layer damping elements are disposed on the laminate structure. The configuration and location of the integral damping elements can be chosen to selectively reduce the gain of one or more dynamic frequencies (modes). Each integral damping element includes a constraining layer portion provided by an area in which one or both of the primary layers are reduced in thickness, preferably by way of a partial etching process. Each integral damping element also includes a constrained damping layer portion provided by an area of the damping layer that lies in interfacial engagement with the reduced thickness area providing the constraining layer portion.

30 Claims, 6 Drawing Sheets

SUSPENSION WITH INTEGRAL CONSTRAINED AND SANDWICHED LAYER DAMPING

BACKGROUND OF THE INVENTION

1. Field of the Invention

The present invention relates to data storage apparatus for magnetically reading and writing information on data storage media. More particularly, the invention concerns the fabrication of suspension assemblies designed to carry read/write heads in magnetic disk drive storage devices.

2. Description of the Prior Art

By way of background, a read/write head of a magnetic disk drive storage device ("disk drive") is typically incorporated on an air bearing slider that is designed to fly closely above the surface of a spinning magnetic disk medium during drive operation. The slider is mounted at the end of a suspension that in turn is cantilevered from the arm of a pivotable actuator. When energized, the actuator sweeps the actuator arm and the cantilevered suspension across the disk surface, allowing the read/write head to read and write data in a series of concentric tracks.

The suspension of a conventional disk drive typically includes a relatively stiff load beam whose base end (known as the "mount plate") is attached to an associated actuator arm and whose free end (known as the "functional end") mounts a flexure that carries an associated slider and its integrated read/write head. Disposed between the mount plate and the functional end of the load beam is a "hinge" that is compliant in the vertical bending direction (normal to the disk surface). The hinge enables the load beam to suspend and load the slider and the read/write head toward the spinning disk surface. It is then the job of the flexure to provide a gimbaled support for the slider so that the read/write head can pitch and roll in order to adjust its orientation for unavoidable disk surface run out or flatness variations.

The foregoing suspension components are quite small. A typical suspension is about 18 mm in length. The load beam typically has a thickness of between about 0.03–0.1 mm and the flexure typically has a thickness of between about 0.02–0.03 mm. The slider is typically about 1.25 mm long×1.00 mm wide×0.30 mm thick, and the read/write head carried thereon is a fraction of that size.

A design requirement of a disk drive suspension load beam is that it be sufficiently compliant in the vertical bending direction to facilitate proper gram loading of the slider and read/write head relative to the supportive air bearing force. At the same time, the load beam must be relatively stiff in the horizontal direction (parallel to the disk surface) to prevent off-track sway misalignment. It must also be torsionally stiff to prevent off-track rotational misalignment.

In addition to these static structural requirements, the suspension as a whole must have good dynamic characteristics to prevent unwanted vibration and flutter. Vibratory excitation of the suspension can be induced by vibration of the disk array and its drive spindle, vibration of the actuator, air flow inside the disk drive housing, and normal track seek and servo operations that drive the suspension at various frequencies. If an excitation frequency is close to a natural frequency of the suspension, the suspension may resonate and be driven to deform according to any of several flexure modes. Mathematically, this behavior can be modeled according to one or more system transfer functions.

Excessive modal motion caused by natural resonance at critical dynamic frequencies can induce unwanted suspension torsion, sway and bending displacement amplitudes, all of which can contribute to track misalignment problems, non-repeatable runout (NRRO) at the head/disk interface, excessive noise, and undue wear. Such dynamic design considerations have become particularly acute as recording density and TPI (Tracks Per Inch) requirements continue to increase. This has necessitated higher track servoing bandwidths, which in turn has established a need for high dynamic performance suspensions whose system transfer function is compatible with the servo bandwidths used today.

Generally speaking, a disk drive suspension should have a high natural frequency and rigidity relative to all of its various flexure modes. In addition, it is customary to provide vibration suppression by introducing passive vibration damping elements into the suspension design. Damping the suspension in this manner tends to reduce vibration amplitude in inverse proportion to the amount of damping force that is present.

Historically, disk drive suspensions have been made from load beams that comprise a single layer of stainless steel sheet stock. To provide passive damping, the practice has been to bond discrete constrained layer damping elements to critical locations on the load beam where damping is needed. A typical prior art constrained layer damping element consists of a layer of viscoelastic damping material bonded to a metal layer made of stainless steel, copper, or some other relatively stiff material.

The constrained layer damping elements operate as follows: As the load beam undergoes sway and torsional vibrations, the load beam sheet stock member undergoes cyclic deformation. Because the damping material is bonded to the sheet stock member, this deformation is transmitted to the bottom surface of the damping material. Because the top surface of the damping material is covered by the constraining metal layer, its top surface is constrained from following the cyclic deformation of the load beam. Therefore, the damping material is sheared perpendicularly across its thickness. Shear motion inside the damping material absorbs the vibrational energy of the load beam and dissipates the energy in heat form, thereby damping the load beam's modal motion.

A disadvantage of the above-described load beam damping solution is that the discrete constrained layer damping elements must be separately mounted to the load beam, which requires additional fabrication steps, adds mass to the system, and limits design options. For example, being discrete elements, the dampers can only be applied in selected locations, and cannot be applied in the load beam hinge area (where they would be most effective) due to adhesion problems.

In more recent years, load beams have been formed using partial etch processing. According to this technique, fabrication begins with a sheet of stainless steel that is rolled to a desired thickness using a rolling reduction technique. Photochemical partial etching is then employed to form areas of reduced thickness in the rolled material, such as the hinge section. In addition, partial etched pockets can be formed to reduce load beam mass and inertia without sacrificing the required static and dynamic stiffness characteristics.

In general, the use of photochemical etching processes allows load beams to perform much better than conventionally formed load beams that have not been etched. This approach has also been found to offer a great deal of design freedom because many elaborate pocket geometries can be formed, thereby allowing dynamic characteristics to be fine-tuned by distributing load beam mass and stiffness in a strategic fashion.

It would be desirable if constrained layer damping could be provided within the context of an etching process used to form mass reducing pockets and other structures that improve load beam dynamic characteristics. What would be particularly desirable is a manufacturing method that allows constrained layer damping elements to be defined in conjunction with the formation of mass reducing pockets and other structures using a single etching process, thereby overcoming the attendant disadvantages of prior art constrained layer damping techniques.

SUMMARY OF THE INVENTION

The foregoing problems are solved and an advance in the art is obtained by an improved suspension member designed to carry a read/write head in a data storage device. According to preferred implementations of the invention, the suspension member is formed from a composite laminate structure that includes first and second primary layers sandwiching an intermediate damping layer that lies between the primary layers. The first and second primary layers are made of a structural load bearing material and the damping layer is made of a viscoelastic damping material.

One or more integral constrained layer damping elements are formed on the laminate structure. Each integral damping element includes a constraining layer portion provided by an area in which one of the primary layers, or both layers, are reduced in thickness, preferably by way of a partial etching process. Each integral damping element also includes a constrained damping layer portion provided by an area of the damping layer that lies in interfacial engagement with the constraining layer portion.

The constraining layer portions of the integral damping elements can be fully detached from an adjacent full thickness portion of the laminate structure. Alternatively, they can be partially or fully attached to an adjacent full thickness portion of the laminate structure.

One of the integral damping elements may have a constraining layer portion provided by an area of reduced primary layer thickness that also defines a load beam hinge. The remaining integral damping elements may have constraining layers provided by areas of reduced thickness that also define pockets designed to reduce load beam mass. These pockets may include single layer pockets formed in only one of the primary layers and double layer pockets formed in both of the primary layers.

The invention further contemplates a suspension assembly and a disk drive incorporating a load beam constructed according to the inventive method.

BRIEF DESCRIPTION OF THE DRAWING

The foregoing and other features and advantages of the invention will be apparent from the following more particular description of preferred embodiments of the invention, as illustrated in the accompanying Drawing, in which.

DETAILED DESCRIPTION OF PREFERRED EMBODIMENTS

Figure 1:
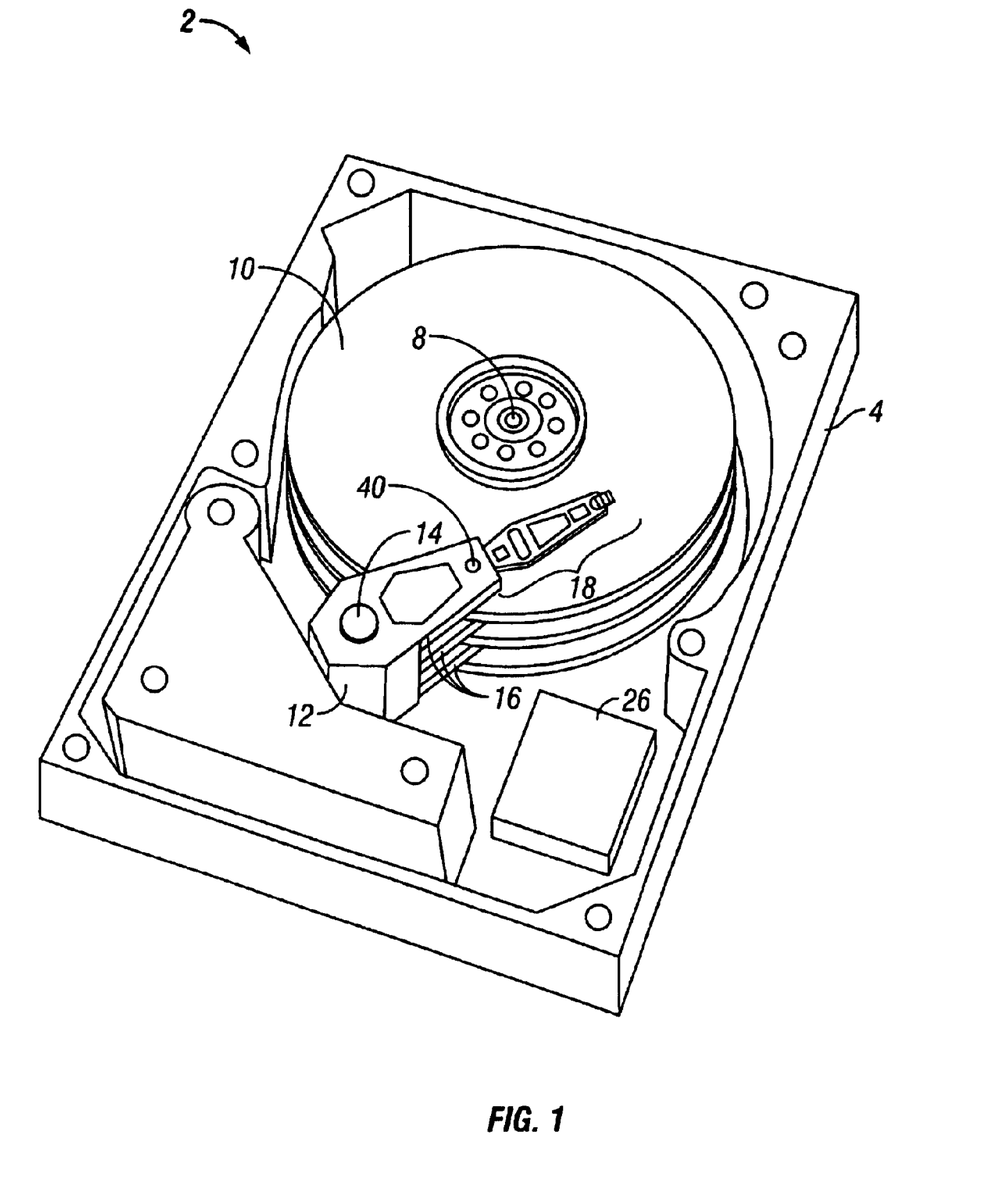
FIG. 1 is an interior perspective view of a magnetic disk drive that incorporates a read/write head suspension load beam fabricated in accordance with the invention.
Figure 2:
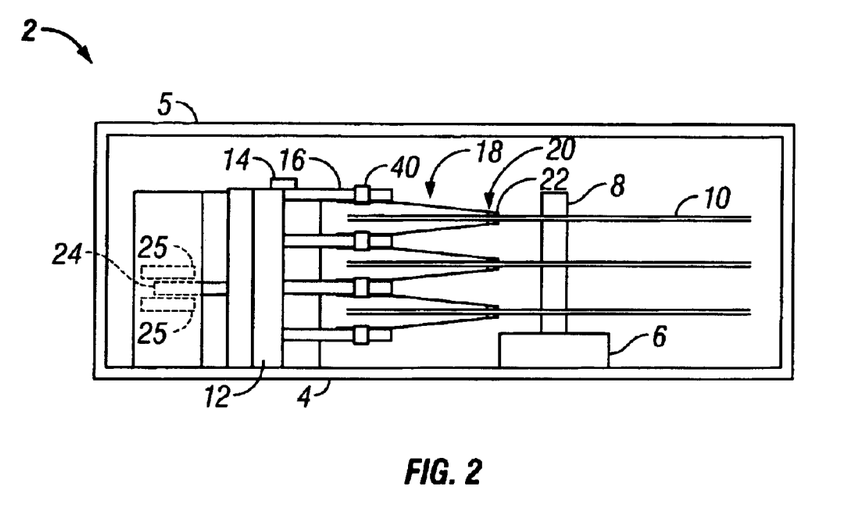
FIG. 2 is a simplified vertical sectional view of the magnetic disk drive of FIG. 1.
Figure 3:
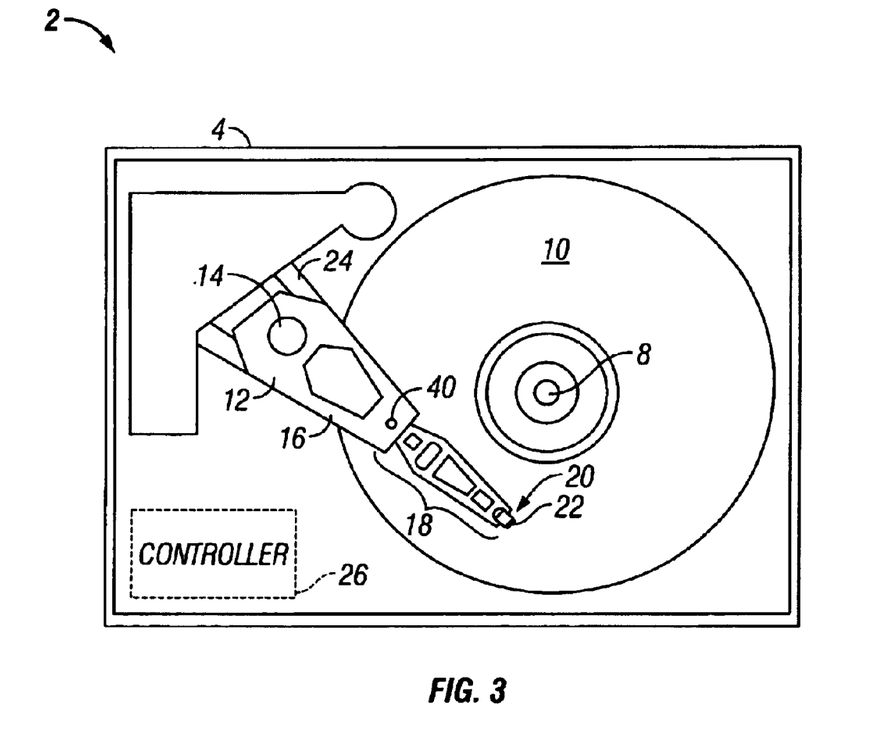
FIG. 3 is a simplified horizontal sectional view of the disk drive of FIG. 1.

Turning now to the figures, wherein like reference numerals represent like elements in all of the several views, FIGS. 1–3 illustrate a disk drive 2 having a suspension load beam (described below) that has been manufactured in accordance with the invention. The disk drive 2 conventionally includes a base casting 4 made from cast aluminum or other suitable material. A cover 5 is removably mounted thereto via a hermetic seal (not shown). The base casting 4 mounts a conventional spindle drive motor 6 having an associated drive spindle 8. The drive spindle 8 carries a stacked array of disks 10 for high speed rotation therewith. The disks 10 are made from a suitable material of a type usually found in magnetic disk drive assemblies. In particular, the disks 10 may be formed from an aluminum or glass substrate with appropriate coatings being applied thereto such that at least one, and preferably both, of the upper and lower surfaces of the disks are magnetically encodable and aerodynamically configured for high speed interaction with a read/write transducer (described below).

Data access to the disk 10 is achieved with the aid of an actuator 12 that is mounted for rotation about a stationary pivot shaft 14. The actuator 12 includes rigid actuator arms 16 that each carry one or two flexible suspensions 18. Each suspension 18 supports an air bearing slider 20 having a read/write transducer 22. The transducer 22 (sometimes referred to as a "transducing head") is an integrated device that includes a magnetic write element (sometimes referred to as a "write head") and a magnetic read element (sometimes referred to as a "read head"). The write element conventionally includes an inductive yoke structure and the read element conventionally includes any of various species of magnetoresistive sensor.

There is preferably one transducer 22 associated with each of the upper and lower surfaces of the disks 10 (see FIG. 2), such that each disk surface is available for data storage. The transducers 22 are positionable to read and write data anywhere on the disk surfaces by pivoting the actuator 12 about the pivot shaft 14. The pivotal motion of the actuator 12 causes the actuator arms 16 to sweep the suspensions 18 across the disk surfaces. This in turn causes the sliders 20 with their mounted transducers 22 to move generally radially from one concentric data track to another. To facilitate pivotal movement of the actuator 12, the actuator conventionally includes a voice coil motor winding 24 (see FIGS. 2 and 3) that is driven by a pair of motor magnets 25 (see FIG. 2).

When the disk drive 2 is powered on, the disks 10 spin up to a desired rotational speed, such as 7400 rpm, 10,000 rpm or higher. This causes an upward air bearing force to develop between the disk surfaces and the sliders 20. This upward air bearing force is counteracted by the downward gram loading force provided by the suspensions 18. If the suspensions 18 are properly fabricated, their gram loading force will enable the transducers 22 to fly very closely above the disk surfaces, allowing high density data recording.

Data recorded on the disks 10 is read by the read head elements of the transducers 22 and processed into readback signals by signal amplification and processing circuitry (not shown) that is conventionally located on the actuator arms 16. The readback signals, which carry both data and transducer position control information, are sent to the disk drive controller, shown diagrammatically at 26, for conventional processing. The controller 26 also generates write data signals during data write operations. The write data signals are delivered via circuitry carried by the actuator arms 16 and suspensions 18 to the write head elements of the transducers 22 for writing data onto the disks 10.

It will be appreciated that the foregoing description of the disk drive 2 is exemplary in nature, and that many other design configurations would be possible while still utilizing the suspension load beam manufacturing method of the invention.

Figure 4:
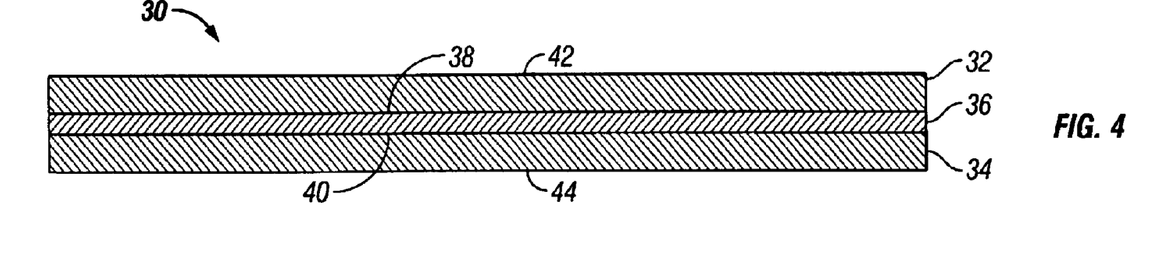
FIG. 4 is a diagrammatic cross-sectional view of a composite laminate structure that is ready for etching to form a load beam in accordance with the invention.
Figure 5:
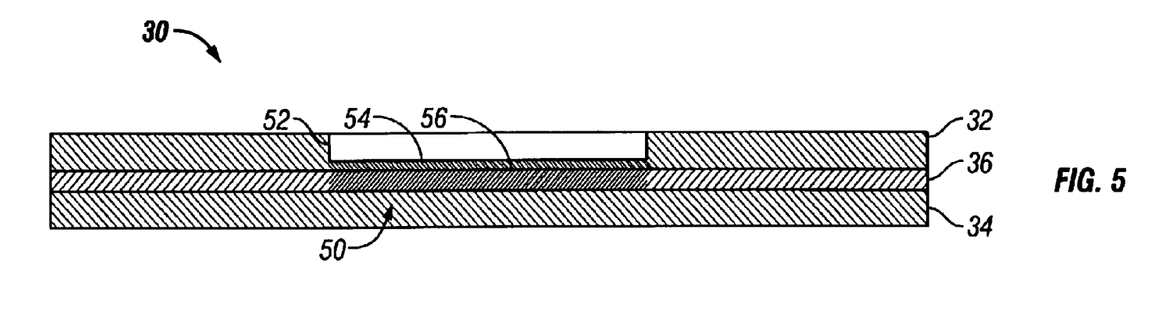
FIG. 5 is a diagrammatic cross-sectional view of the laminate structure of FIG. 4 showing one exemplary configuration of an integral damping element according to the invention.
Figure 6:
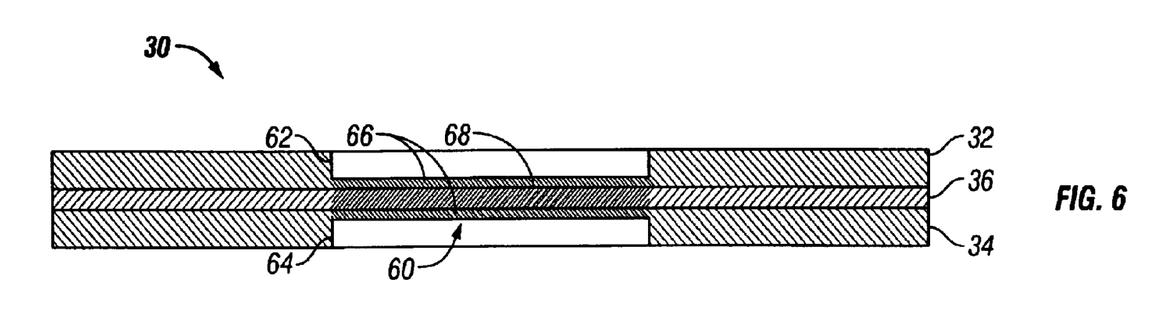
FIG. 6 is a diagrammatic cross-sectional view of the laminate structure of FIG. 4 showing another exemplary configuration of an integral damping element according to the invention.

Turning now to FIGS. 4–6, an exemplary method will be described for manufacturing a load beam for use in the suspension 18 of FIGS. 1–3. According to this method, the fabrication of a load beam begins as shown in FIG. 4 with the formation of a composite laminate structure 30 having first and second primary layers 32 and 34 sandwiching an intermediate damping layer 36. The primary layers 32 and 34 are preferably preformed material sheets made from a structural load bearing material, such as stainless steel, aluminum, or a glass/ceramic material. The damping layer 36 is made from a suitable damping material, such as a polyimide or a viscoelastic polymer.

The laminate structure 30 can be formed in a variety of ways. For example, the viscoelastic material that provides the damping layer 36 can be coated in liquid form onto one of the primary layer material sheets. The remaining primary layer material sheet is then placed over the viscoelastic material and the entire assembly is laminated using a conventional lamination process.

Upon the formation of the laminate structure 30, the first primary layer 32 will facially engage a first side 38 of the damping layer 36, and the second primary layer 34 will facially engage a second side 40 of the damping layer. Preferably, an adhesive bond exists at these facial interfaces so that shear loads can be transferred between the first and second primary layers 32 and 34 and the damping layer 36. The first and second primary layers 32 and 34 will respectively define first and second surfaces 42 and 44 of the laminate structure 30, and will have respective nominal thicknesses lying in a direction that is substantially normal to the first and second surfaces. Typical thickness values will lie in a range of about 0.015–0.035 mm. Note these values are exemplary only and may be expected to decrease as higher data rates are pursued in future designs.

As shown in FIG. 4, the first and second primary layers 32 and 34 can each have the same thickness. Alternatively, the respective thicknesses of the first and second primary layers 32 and 34 may be different (not shown). This feature can be used to provide better control over load beam vertical bending compliance.

The damping layer thickness that will typically be at the low end of the thickness range of the primary layers 32 and 34, i.e., about 0.015 mm. Other thickness values may also be used, and will depend in part on the damping material used and the required damping characteristics.

Following the formation of the laminate structure 30, additional suspension fabrication processing is performed to selectively convert one or more areas of the laminate structure into constrained layer damping elements according to dynamic design requirements. As described in more detail below with reference to FIGS. 5 and 6, each integral damping element includes a constraining layer portion provided by an area in which one or both of primary layers 32 and 34 are reduced in thickness, preferably by way of a partial etching process. Each integral damping element further includes a constrained damping layer portion provided by an area of the damping layer that lies in interfacial engagement with the constraining layer portion.

In FIG. 5, the laminate structure 30 is provided with an integral damping element 50 (shown by darkened cross-hatching) formed by partially etching the primary layer 32 to a selected depth at a selected location on the laminate structure. This etched area is designated by reference numeral 52 in FIG. 5. The etching process is designed so that only a relatively thin layer of the material forming the primary layer 32 remains above the damping layer 36 in the etched area 52. An area of reduced primary layer thickness is thus formed that provides a constraining layer portion 54 of the integral damping element 50. The thickness of the constraining layer portion 54 can be varied according to load beam mass distribution requirements, materials used, and other design considerations. However, it must be thick enough to provide a suitable reaction area for vibrational forces introduced into the damping layer 36. Relative to the damping layer 36, the portion thereof that underlies the constraining layer portion 54 forms a constrained damping layer portion 56 of the integral damping element 50. The constrained damping layer portion 56 functions to receive vibrational forces from the primary layer 34. Due to the presence of the constraining layer portion 54 above the constrained damping layer portion 56, vibrations in the laminate structure 30 induce shear forces in the constrained damping layer portion, such that vibrational energy is dissipated as heat.

In FIG. 6, the laminate structure 30 is provided with an integral damping element 60 (shown by darkened cross-hatching) formed by partially etching both of the primary layers 32 and 34 to selected depths at a selected location on the laminate structure. The etched areas of the primary layers 32 and 34 are respectively designated by reference numerals 62 and 64 in FIG. 6. In order to reduce load beam mass, the etching process is designed so that only a relatively thin layer of the material forming the first and second primary layers 32 and 34 respectively remains above and below the damping layer 36 in the etched areas 62 and 64. Opposing areas of reduced primary layer thickness are thus formed that provide a constraining layer portion 66 of the integral damping element 50. The portion of the damping layer 36 that underlies the constraining layer portion 66 forms a constrained damping layer portion 68 of the integral damping element 60.

Figure 7:
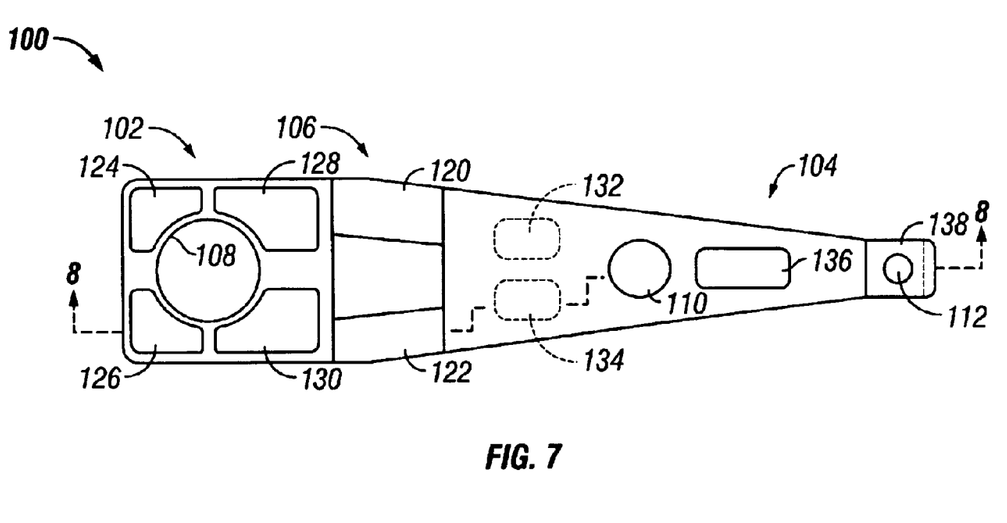
FIG. 7 is a plan view of an exemplary load beam constructed in accordance with the invention for use in a dimpled suspension.
Figure 8:
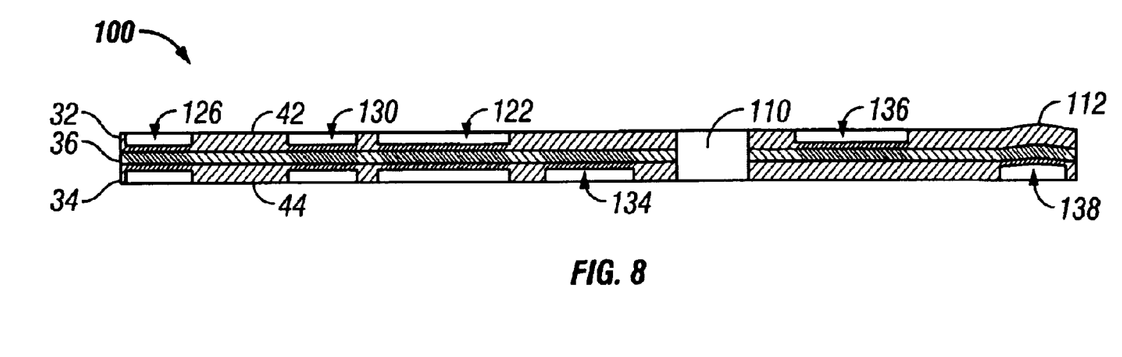
FIG. 8 is a diagrammatic cross-sectional view taken along line 8—8 in FIG. 7.

Turning now to FIGS. 7–8, the principles of the invention will be further presented with reference to an exemplary suspension load beam 100 that is fabricated with plural integrated damping elements according to the method disclosed above. Advantageously, the integral damping elements can be constructed at any desired location depending on load beam design requirements. Note that the load beam 100 has a configuration that has been selected for purposes of illustration only and not by way of limitation. Other configurations would also be possible.

As best shown in FIG. 8, the load beam 100 can be made from same laminate material sheet 30 shown in FIG. 4. The load beam 100 will thus include first and second primary structural layers 32 and 34 sandwiching a damping layer 36, and it will have first and second surfaces 42 and 44. This allows the load beam 100 to undergo partial etching to form the various reduced thickness areas required to define the integral damping elements.

As best shown in FIG. 7, the load beam 100 includes a mount plate 102 adapted for mounting to one of the actuator arms 16 of FIGS. 1–3. The load beam 100 likewise includes a functional end 104 adapted for mounting to a flexure (not shown). Disposed between the mount plate 102 and the functional end 104 is a hinge 106 that is designed to impart bending flexibility according to load beam gram loading requirements. The load beam's mount plate 102 includes a large attachment aperture 108 (shown in FIG. 7 only) that allows the load beam 100 to be attached to an associated one of the actuator arms 16 using a conventional swage or rivet connector 40 (see FIGS. 1–3). By way of example only, another aperture 110 can be formed near the load beam's functional end 104. The functional end itself includes a dimple formation 112 for gimbaling a flexure (not shown) that is mounted to the load beam 100 in a subsequent processing step. A conventional load/unload tab can also be formed at the functional end 104, but is not shown insofar as it is not relevant to the present discussion.

As can be seen collectively in FIGS. 7 and 8, the load beam 100 is etch processed to define ten integral damping elements therein, shown by reference numerals 120, 122, 124, 126, 128, 130, 132, 134, 136 and 138. Two of the integral damping elements, namely, damping elements 120 and 122, have constraining layer portions provided by areas of reduced primary layer thickness that also define the load beam hinge 106. As can be seen in FIG. 8, the integral damping elements 120 and 122 are formed by etching both of the primary layers 32 and 34. The integral damping elements 120 and 122 may thus be of the same configuration as the integral damping element 60 described above with reference to FIG. 6.

Seven of the integral damping elements, namely damping elements 124, 126, 128, 130, 132, 134 and 136, have constraining layer portions provided by areas of reduced thickness that also define pockets designed to reduce load beam mass (mass reducing pockets). Four of the mass reducing pockets, namely, the pockets defining integral damping elements 124, 126, 128 and 130, are double layer pockets formed by etching both of the primary layers 32 and 34. The integral damping elements 124, 126, 128 and 130 may thus be of the same configuration as the integral damping element 60 described above with reference to FIG. 6. Three of the mass reducing pockets, namely, the pockets defining integral damping elements 132, 134 and 136, are single layer pockets formed by etching only one of the primary layers 32 or 34. In particular, the primary layer 34 is etched to define the integral damping elements 132 and 134, and the primary layer 32 is etched to define the integral damping element 136. The integral damping elements 132, 134 and 136 may thus be of the same configuration as the integral damping element 50 described above with reference to FIG. 5.

The final integral damping element 138 is formed at the load beam functional end 104 by partially etching the primary layer 34. The dimple 112 can then be formed by conventional die forming of the primary layer 32 along with the damping layer 36 and the constraining damping layer portion of the integral damping element 138 made by partially etching the primary layer 34. Except for being die formed, the integral damping element 138 is of the same configuration as the integral damping element 50 described above with reference to FIG. 5.

All of the integral damping elements 120–138 can be formed using a conventional photochemical etching process to partially etch into one or both of the primary layers 32 and 34 to remove material down to the desired thickness of each damping element's constraining layer portion. Advantageously, the use of an etching process to define integral damping elements provides a great deal of design flexibility. For example, integral damping elements can now be added to the load beam hinge area (see integral damping elements 120 and 122), whereas this has not heretofore been practical. Other integral damping elements, particularly those formed as part of mass reducing pockets, can be configured and located with complete design freedom according to load beam design goals. For example, integral damping elements/mass reducing pockets can be formed in one or both primary layers in the same or alternate locations to provide vibration control of specific frequency gains, thereby selectively tuning desired frequencies for lower gain. Thus, a highly customized system transfer function can be defined that is more suitable for better servo performance, higher servo bandwidth and improved error rejection for higher recording density. The integral damping elements of the invention may also be defined to address other design issues, such as noise reduction.

Turning now to FIGS. 9A–11B, further customization of the integral damping elements of the invention may be achieved by selectively configuring the edges of the constraining layer portions thereof to define different peripheral anchoring arrangements. For example, an integral damping element's constraining layer portion can be fully detached from an adjacent full thickness portion of the laminate structure, thereby providing no peripheral anchoring. Alternatively, a constraining layer portion can be partially or fully attached to an adjacent full thickness portion of the laminate structure, thereby providing different levels of peripheral anchoring according to design needs.

Figure 9A:
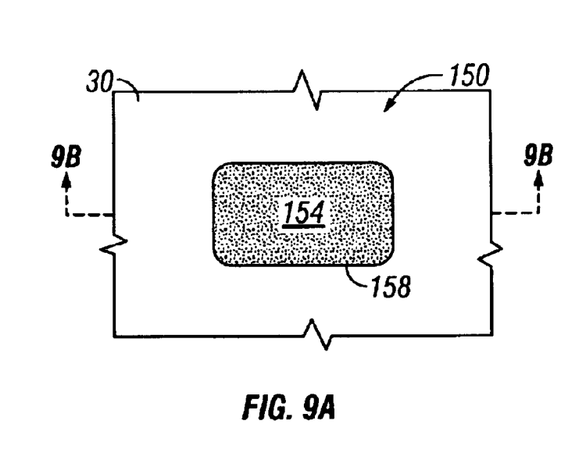
FIG. 9A is a partial plan view of an integral damping element with a fully attached constrained layer portion.
Figure 9B:
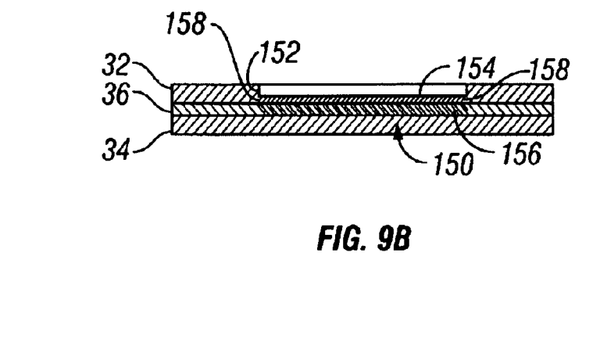
FIG. 9B is cross-sectional view taken along line 9B—9B in FIG. 9A.

FIGS. 9A and 9B illustrate a full peripheral attachment configuration in which an integral constrained layer damping element 150 is formed in the laminate structure 30 of FIG. 4. The integral damping element 150 is formed by partially etching the primary layer 32, as shown by reference numeral 152. The etch process produces a constraining layer portion 154 that overlies a constrained damping layer portion 156. The constraining layer portion 154 has a peripheral edge 158 that is best shown in FIG. 9A. As can also be seen in FIG. 9B, the peripheral edge 158 is fully attached to an adjacent full thickness portion of the laminate structure 30.

Figure 10A:
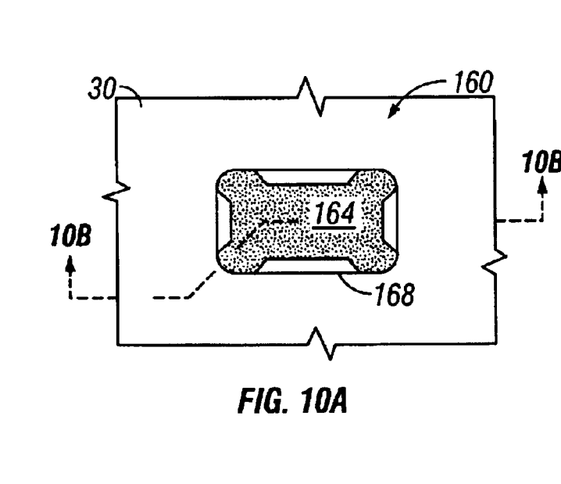
FIG. 10A is a partial plan view of an integral damping element with a partially attached constrained layer portion.
Figure 10B:
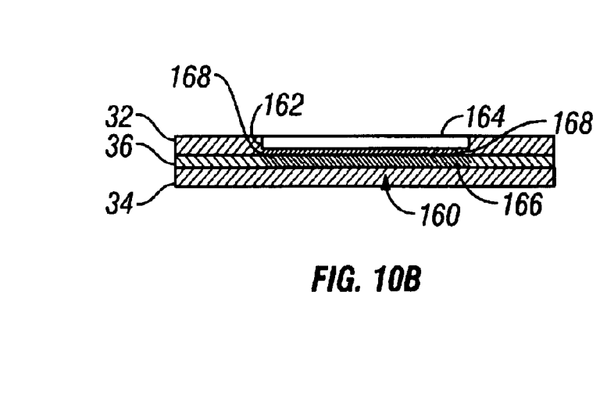
FIG. 10B is cross-sectional view taken along line 10B—10B in FIG. 10A.

FIGS. 10A and 10B illustrate a partial peripheral attachment configuration in which an integral constrained layer damping element 160 is formed in the laminate structure 30 of FIG. 4. The integral damping element 160 is formed by partially etching the primary layer 32, as shown by reference numeral 162. The etch process produces a constraining layer portion 164 that overlies a constrained damping layer portion 166. The constraining layer portion 164 has a peripheral edge 168 that is best shown in FIG. 10A. As can also be seen in FIG. 10B, the peripheral edge 168 is not fully attached to an adjacent full thickness portion of the laminate structure 30.

Figure 11A:
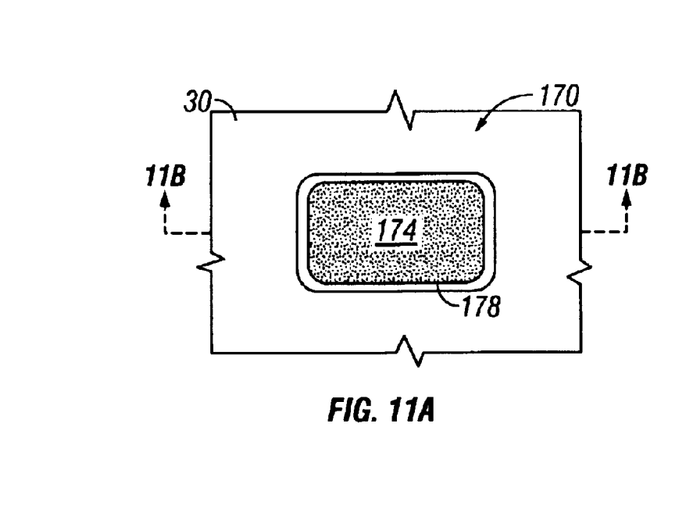
FIG. 11A is a partial plan view of an integral damping element with a fully detached constrained layer portion.
Figure 11B:
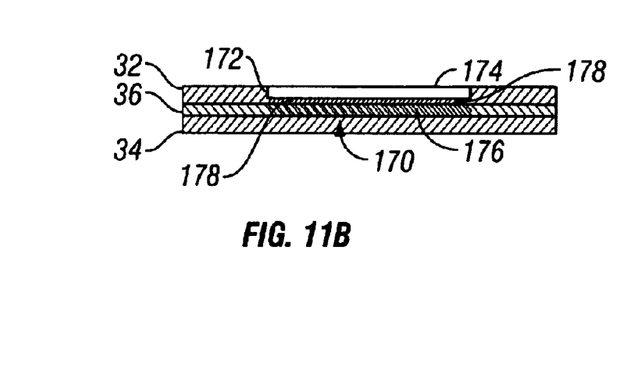
FIG. 11B is cross-sectional view taken along line 11B—11B in FIG. 11A.

FIGS. 11A and 11B illustrate a full peripheral detachment configuration in which an integral constrained layer damping element 170 is formed in the laminate structure 30 of FIG. 4. The integral damping element 170 is formed by partially etching the primary layer 32, as shown by reference numeral 172. The etch process produces a constraining layer portion 174 that overlies a constrained damping layer portion 176. The constraining layer portion 174 has a peripheral edge 178 that is best shown in FIG. 11A. As can also be seen in FIG. 11B, the peripheral edge 178 is not attached to an adjacent full thickness portion of the laminate structure 30.

Figure 12:
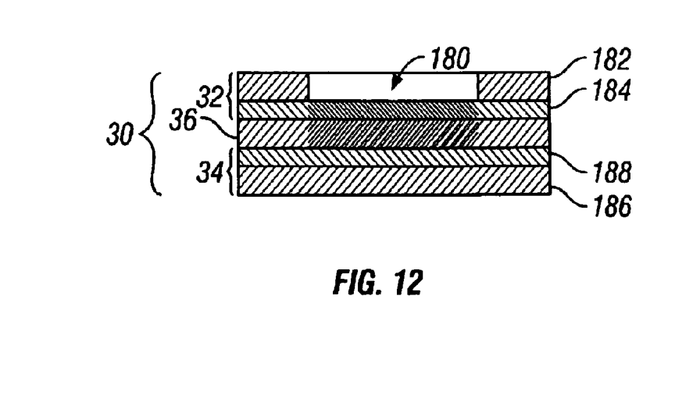
FIG. 12 is a cross-sectional view of a modified form of the composite laminate structure of FIG. 4 with an integral damping element formed thereon.
Figure 13:
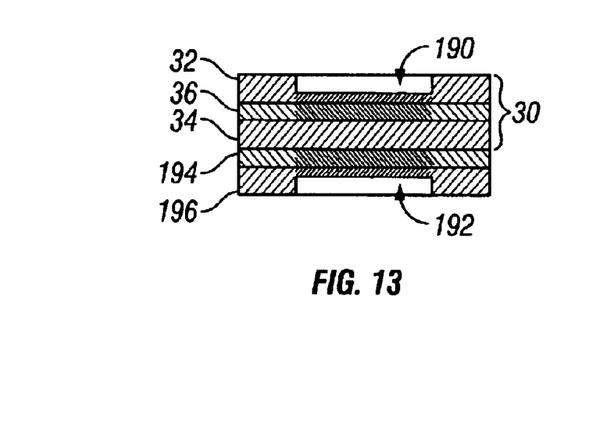
FIG. 13 is a cross-sectional view of the composite laminate structure of FIG. 4 with supplemental structural and damping layers added thereto and with a pair of integral damping elements formed thereon.

Accordingly, a method for manufacturing a suspension load beam has been disclosed. While various embodiments of the invention have been described, it should be apparent that many variations and alternative embodiments could be implemented in accordance with the invention. For example, as shown in FIG. 12, a constrained layer integral damping element 180 could be made using a modified form of the composite laminate structure 30 of FIG. 4 in which the primary layers 32 and 34 are themselves laminate structures that each include a main structural sub-layer and an etch stop sub-layer. Thus, the primary layer 32 has a main structural sub-layer 182 and an etch stop sub-layer 184. The primary layer 34 has a main structural sub-layer 186 and an etch stop sub-layer 188. Another exemplary design alternative is shown in FIG. 13. Here, a constrained layer damping element 190 is formed in the composite laminate structure 30 of FIG. 4. An additional constrained layer damping element 192 is then formed using a supplemental damping layer 194 disposed on the primary layer 34 and a supplemental primary layer 196 disposed on the damping layer 194.

It is understood, therefore, that the invention is not to be in any way limited except in accordance with the spirit of the appended claims and their equivalents.

What is claimed is:

1. A method of manufacturing a vibration dampened disk drive suspension member, comprising:
    forming a laminate structure having first and second primary layers sandwiching an intermediate damping layer that lies between said primary layers;
    said first and second primary layers being made of a structural load bearing material;
    said damping layer being made of a viscoelastic damping material;
    forming one or more integral constrained layer damping elements on said laminate structure, each of said integral damping elements including:
        a constraining layer portion formed by partially etching one or both of said primary layers to a selected depth at a selected location on said laminate structure to define an area of reduced primary layer thickness; and
        a constrained damping layer portion provided by an area of said damping layer that lies in interfacial engagement with said constraining layer.

2. A method in accordance with claim 1 wherein said primary layers are made from a material selected from the group consisting of stainless steel, aluminum and ceramic material, and said damping layer is made from a material selected from the group consisting of polyimides and viscoelastic polymers.

3. A method in accordance with claim 1 wherein at least one of said integral damping elements is formed with its constraining layer portion being fully detached from an adjacent full thickness portion of said laminate structure.

4. A method in accordance with claim 1 wherein at least one of said integral damping elements is formed with its constraining layer portion being partially attached to an adjacent full thickness portion of said laminate structure.

5. A method in accordance with claim 1 wherein at least one of said integral damping elements is formed with its constraining layer portion being fully attached to an adjacent full thickness portion of said laminate structure.

6. A method in accordance with claim 1 wherein at least one of said integral damping elements has a constraining layer portion formed by partially etching only one of said primary layers.

7. A method in accordance with claim 1 wherein at least one of said integral damping elements has a constraining layer portion formed by partially etching both of said primary layers.

8. A method of manufacturing a vibration dampened disk drive suspension member, comprising:
    forming a laminate structure having first and second primary layers sandwiching an intermediate damping layer that lies between said primary layers;
    said first and second primary layers being made of a structural load bearing material;
    said damping layer being made of a viscoelastic damping material;
    forming one or more integral constrained layer damping elements on said laminate structure, each of said integral damping elements including:
        a constraining layer portion formed by partially etching one or both of said primary layers to a selected depth at a selected location on said laminate structure to define an area of reduced primary layer thickness; and
        a constrained damping layer portion provided by an area of said damping layer that lies in interfacial engagement with said constraining layer; and
    wherein one of said integral damping elements has a constraining layer portion formed by an area of reduced primary layer thickness that also defines a load beam hinge.

9. A method in accordance with claim 8 wherein plural ones of said integral damping elements have constraining layer portions formed by areas of reduced primary layer thickness that also define pockets designed to reduce load beam mass.

10. A method in accordance with claim 9 wherein said pockets include single layer pockets formed in only one of said primary layers and double layer pockets formed in both of said primary layers.

11. In a disk drive suspension assembly mounting a transducer-carrying slider, said suspension assembly comprising:
    a suspension member formed from a composite laminate structure that includes first and second primary layers sandwiching an intermediate damping layer that lies between said primary layers;
    said first and second primary layers being made of a structural load bearing material;
    said damping layer being made of a viscoelastic damping material;
    one or more integral constrained layer damping elements disposed on said laminate structure, each of said integral damping elements including:
        a constraining layer portion provided by an area of reduced primary layer thickness at a selected location on said laminate structure; and
        a constrained damping layer portion provided by an area of said damping layer that lies in interfacial engagement with said constraining layer portion.

12. A suspension assembly in accordance with claim 11 wherein said primary layers are made from a material selected from the group consisting of stainless steel, aluminum and ceramic material, and said damping layer is made from a material selected from the group consisting of polyimides and viscoelastic polymers.

13. A suspension assembly in accordance with claim 11 wherein at least one of said integral damping elements has a constraining layer portion that is fully detached from an adjacent full thickness portion of said laminate structure.

14. A suspension assembly in accordance with claim 11 wherein at least one of said integral damping elements has a constraining layer portion that is partially attached to an adjacent full thickness portion of said laminate structure.

15. A suspension assembly in accordance with claim 11 wherein at least one of said integral damping elements has a constraining layer portion that is fully attached to an adjacent full thickness portion of said laminate structure.

16. A suspension assembly in accordance with claim 11 wherein at least one of said integral damping elements has a constraining layer portion provided by a n area of reduced primary layer thickness in which only one of said primary layers is of reduced thickness.

17. A suspension assembly in accordance with claim 11 wherein at least one of said integral damping elements has a constraining layer portion provided by an area of reduced primary layer thickness in which both of said primary layers are of reduced thickness.

18. A suspension assembly in accordance with claim 11 wherein plural ones of said integral damping elements have constraining layer portions provided by areas of reduced primary layer thickness that also define pockets designed to reduce load beam mass.

19. A suspension assembly in accordance with claim 18 wherein said pockets include single layer pockets formed in only one of said primary layers and double layer pockets formed in both of said primary layers.

20. In a disk drive suspension assembly mounting a transducer-carrying slider, said suspension assembly comprising:
    a suspension member formed from a composite laminate structure that includes first and second primary layers sandwiching an intermediate damping layer that lies between said primary layers;
    said first and second primary layers being made of a structural load bearing material;
    said damping layer being made of a viscoelastic damping material;
    one or more integral constrained layer damping elements disposed on said laminate structure, each of said integral damping elements including:
        a constraining layer portion provided by an area of reduced primary layer thickness at a selected location on said laminate structure; and
        a constrained damping layer portion provided by an area of said damping layer that lies in interfacial engagement with said constraining layer portion; and
    wherein one of said integral damping elements has a constraining layer portion provided by an area of reduced primary layer thickness that also defines a load beam hinge.

21. In a disk drive having a housing, a rotatable magnetic recording medium in the housing, an actuator carrying an actuator arm, a suspension assembly, a slider and a read/write transducer, said suspension assembly comprising:
    a suspension member formed from a composite laminate structure that includes first and second primary layers sandwiching an intermediate damping layer that lies between said primary layers;
    said first and second primary layers being made of a structural load bearing material;
    said damping layer being made of a viscoelastic damping material;
    one or more integral constrained layer damping elements disposed on said laminate structure, each of said integral damping elements including:
        a constraining layer portion provided by an area of reduced primary layer thickness at a selected location on said laminate structure; and
        a constrained damping layer portion provided by an area of said damping layer that lies in interfacial engagement with said constraining layer portion.

22. A disk drive in accordance with claim 21 wherein said primary layers are made from a material selected from the group consisting of stainless steel, aluminum and ceramic material, and said damping layer is made from a material selected from the group consisting of polyimides and viscoelastic polymers.

23. A disk drive in accordance with claim 21 wherein at least one of said integral damping elements has a constraining layer portion that is fully detached from an adjacent full thickness portion of said laminate structure.

24. A disk drive in accordance with claim 21 wherein at least one of said integral damping elements has a constraining layer portion that is partially attached to an adjacent full thickness portion of said laminate structure.

25. A disk drive in accordance with claim 21 wherein at least one of said integral damping elements has a constraining layer portion that is fully attached to an adjacent full thickness portion of said laminate structure.

26. A disk drive in accordance with claim 21 wherein at least one of said integral damping elements has a constraining layer portion provided by an area of reduced primary layer thickness in which only one of said primary layers is of reduced thickness.

27. A disk drive in accordance with claim 21 wherein at least one of said integral damping elements has a constraining layer portion provided by an area of reduced primary layer thickness in which both of said primary layers are of reduced thickness.

28. A disk drive in accordance with claim 21 wherein plural ones of said integral damping elements have constraining layer portions provided by areas of reduced primary layer thickness that also define pockets designed to reduce load beam mass.

29. A disk drive in accordance with claim 28 wherein said pockets include single layer pockets formed in only one of said primary layers and double layer pockets formed in both of said primary layers.

30. In a disk drive having a housing, a rotatable magnetic recording medium in the housing, an actuator carrying an actuator arm, a suspension assembly, a slider and a read/write transducer, said suspension assembly comprising:

a suspension member formed from a composite laminate structure that includes first and second primary layers sandwiching an intermediate damping layer that lies between said primary layers;

said first and second primary layers being made of a structural load bearing material;

said damping layer being made of a viscoelastic damping material;

one or more integral constrained layer damping elements disposed on said laminate structure, each of said integral damping elements including:

a constraining layer portion provided by an area of reduced primary layer thickness at a selected location on said laminate structure; and a constrained damping layer portion provided by an area of said damping layer that lies in interfacial engagement with said constraining layer portion; and wherein one of said integral damping elements has a constraining layer portion provided by an area of reduced primary layer thickness that also defines a load beam hinge.

* * * * *